C. P. TILLINGHAST.

Railroad Car Ventilator.

No. 9,572. Reissued Feb. 15, 1881.

WITNESSES.

W. H. Thurston

J. Knight

INVENTOR.

Clark P. Tillinghast

N. PETERS, PHOTO-LITHOGRAPHER, WASHINGTON, D. C.

UNITED STATES PATENT OFFICE.

CLARK P. TILLINGHAST, OF PROVIDENCE, RHODE ISLAND.

RAILROAD-CAR VENTILATOR.

SPECIFICATION forming part of Reissued Letters Patent No. 9,572, dated February 15, 1881.

Original No. 110,803, dated January 3, 1871. Application for reissue filed July 28, 1880.

*To all whom it may concern:*

Be it known that I, CLARK P. TILLINGHAST, of the city and county of Providence, and State of Rhode Island, have invented a new and useful Improvement in Car-Ventilators and Dust-Guards; and I do hereby declare that the following specification, taken in connection with the accompanying drawings, forming a part of the same, is a full, clear, and exact description thereof.

My invention relates to that class of ventilators and dust-guards which are applied to car-windows; and it consists of hinged deflectors capable of being placed in a position to produce outgoing currents of air, and to prevent dust and cinders from passing into the car.

Prior to my invention deflectors have been pivoted to a car at the windows for the purposes described; but said deflectors have been constructed and attached in such a manner as to leave an open joint between the pivoted edge of the deflector and the car, through which joint dust and cinders could enter.

My improvement consists in so constructing and mounting the deflectors for ventilating the car as to prevent the entrance of dust and cinders between the hinged edges of the deflectors and the car, as will hereinafter appear.

Figure 1:
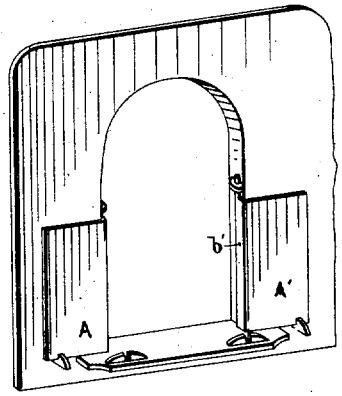
Figure 2:
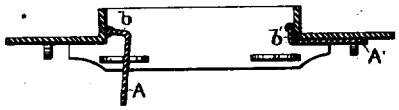
Figure 3:
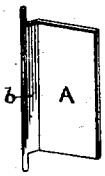

Referring to the drawings, Figure 1 represents, in perspective, a car-window provided with deflectors which are hinged to the window-jambs and are bent at right angles, so that they may be turned flat against the side of the car when they are not in use. Fig. 2 shows a horizontal section of the same with one of the deflectors extended and the other closed. Fig. 3 represents, in perspective, one of said deflectors detached; and Fig. 4 shows, in horizontal section, a car-window provided with deflectors which are hinged to the outside of the car.

As shown in Figs 1 and 2, A A′ are the deflectors, which are bent so as to conform to the window-jambs and car-side when the deflectors are closed and not in use. They are hinged to said jambs in a plane in the rear of the side of the car, so that the jambs shield the joint of the hinge. The external dust-laden current of air, therefore, will not impinge against the joints of the deflectors with the car, but will strike against the main portion of the deflectors when they are extended, and will be turned outward from the joint, thereby producing the desired results of ventilation and exclusion of dust.

Figure 4:
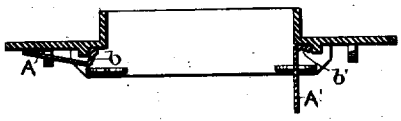

Instead of hinging the deflectors to the window-jambs, they may be hinged to the side of the car, adjacent to vertical strips, as shown at Fig. 4. These strips will serve, on the same principle as the window-jambs in the arrangement shown at Fig. 1, to shield the joint and prevent the entrance of dust through the same.

It is evident that a close round hinge attached to the inner edge of the deflector would in a measure serve a similar purpose, and yet be within the scope of my invention, which consists in providing the deflectors with such a means of close connection with the car as will direct the current of air past the point of junction with the car when the leaf is extended outward and in use. Any of the ordinary forms of shutter-latches will serve to keep the deflectors in extended and closed positions.

Having described my invention, what I claim, and desire to secure by Letters Patent, is—

1. The improvement in car-ventilators or dust-guards which consists in providing the leaves A and A′ with the right-angled edges *b b′*, hinged to the car, substantially as described, by means of which the current of air is directed past the joint with the window-jamb or side of the car, as and for the purposes specified.

2. The combination, with the side of a car, of hinged deflectors or dust-guards having their hinged edges shielded by a "break-joint" strip projecting from the car-side, to deflect the current of air past the joint and prevent the entrance of dust, substantially as set forth.

CLARK P. TILLINGHAST.

Witnesses:
W. H. THURSTON,
I. KNIGHT.